Patented Nov. 26, 1946

2,411,736

UNITED STATES PATENT OFFICE 2,411,736

METHOD OF CANNING FRESH WATER FISH

Armin R. Kleinschmidt, Mankato, Minn.

No Drawing. Application April 6, 1945,
Serial No. 587,015

15 Claims. (Cl. 99—188)

This application is a continuation-in-part of my application Ser. No. 579,680 filed February 24, 1945.

This invention relates to a process of canning fresh water fish and particularly to the canning of fish such as carp, buffalo, sheepshead, suckers, ciscos, bull heads and the like. Fresh water fish have not heretofore proven suitable for canning according to known fish canning processes because of the high moisture content and the softness of the flesh. When utilizing known fish canning processes the resultant product is mushy and unappetizing with a disagreeable fishy taste. In addition, the fresh water fish have a "muddy" taste that it has been impossible to remove. It has heretofore been thought that the "muddy" taste was due to the type of water in which the fish were caught, and it has been suggested that in order to remove the "muddy" flavor, the fish be confined while alive in running water having a sandy bottom and the fish fed special diets. I have discovered that even these expensive expedients are not effective for the removal of the "muddy" flavor. In addition during the canning of such fresh water fish in accordance with known processes the bones do not become edible and the large bones protrude from the flesh when canned and present an undesirable appearance.

I have discovered that these difficulties of the prior processes may be overcome and that fresh water fish may be canned, the product so obtained being firm, free from "muddy" flavor and disagreeable fishy flavor, wholesome, nutritious, of good color and free from inedible bones.

It is, therefore, an object of the present invention to provide methods of canning fresh water fish. It is also an object of the invention to provide methods of canning fresh water fish wherein the final product is free from "muddy" or disagreeable fishy flavor and is firm, wholesome, nutritious and free from inedible bone structure and of good color.

Other and further objects of the invention are those inherent in the method herein illustrated, described and claimed.

In accordance with the present invention the fresh water fish or solidly frozen fresh water fish, if not stored in the solidly frozen state for an excessive period, are filleted by cutting on either side of the back bone so as to remove the back bone structure. The fillet is then removed by an incisive cut between the skin of the fish and the flesh structure. With larger coarse fish, the fish may be skinned. In this operation the rib bones of the fish are preferably kept on the fillet and removed subsequently in order to minimize the wastage of edible tissue which accompanies removal of the rib bones in the filleting operation. If such waste is not objectionable the rib bones may be removed by cutting between the fleshy portion of the fillet and the layer containing the rib bones.

The fillets are then placed in a brine for 1½ to 2½ hours, preferably 2 hours. The brine used should have a salinity of 80% to 100% saturation, preferably about 90% saturation, at 75° F. or alternatively the fillets may be brined for 1½ to 2½ hours in a 20% salt brine at 75° F. and after removal from the brine, packed in dry salt for approximately 8 hours.

The brining operation serves to make the flesh of the fish more solid and in addition serves to reduce the blood content of fish such as carp. The brining step may therefore be dispensed with where the final product may permissibly have somewhat less firmness.

After the brining operation, where used, the fillets are removed and rinsed and are then placed in single layers on a wire tray or basket and positioned so that the outside portion of the fillet, i. e. the portion next to the skin, is up. The baskets or trays of fillets are then placed in a steaming retort for a period sufficient to loosen the "muddy" streaks hereinafter defined and properly reduced the moisture content. A pre-cook of 1 to 1½ hours at a temperature of 220° to 260° F. usually suffices. The preferred temperature is 240° F. At the end of the steaming operation the trays of steamed fillets are removed and are cooled to approximately room temperature which is usually accomplished in a time of 1 to 2 hours, although they may be cooled longer if desired.

The pre-cooking operation serves to cause a change in color of several distinct fleshy portions of the fillet and reduces the water content. At about the median line of the fillet and on the outside of the fillet, in respect to its location in the live fish, there is a streak of fleshy material sometimes called the "lateral line." When the fillet is cross sectional this streak will be seen to be relatively wide at the outer surface of the fillet and tapered to a point on the interior of the fillet portion. In the live or uncooked flesh this streak is not very clearly delineated. However, after the fillets have been pre-cooked by steaming as described, this "muddy streak" in the flesh or "lateral line" as it is sometimes called, is relatively soft whereas the remaining portion of the fillet has a much firmer texture. Some variation in color of the median streak as compared with the remaining portion of the fillet also occurs. In the female fish a large proportion of the fillet is white, and after cooking the "muddy streak" is dark and clearly delineated. In the male fish the major portion of the fillet ranges in color from relatively light at the forward portion to dark near the tail portion and when cooked the "muddy streak" is dark throughout its length. It is therefore fairly evident at the forward portion of the fillet but less evident toward the rear or tail portion of the fillet. However, in each type of fillet, male or female, the "muddy streak" is of soft texture as compared with the remainder of the fillet and its location therefore easily determined after the fillets have been pre-cooked.

I have discovered that the "muddy flavor" and disagreeable fishy taste of the fresh water fish is due to the soft, "muddy streak," and to overcome this taste difficulty it is removed in the process of the present invention. The "muddy streak" of relatively soft textured flesh may easily be removed by using a paring knife or a V-shaped tool which is drawn down the streak. This plows or lifts out the softened material which is then discarded or used for waste products. An easy separation of the "muddy streak" from the remainder of the fillet is then easily possible as after cooking there seems to be a line of cleavage separating the "muddy streak" from the fillet, and it is therefore possible to remove the streak almost as a whole. Throughout this specification and in the claims the term "muddy streak" shall be taken to mean the above described "lateral line," however elsewhere designated. After cooking and before removal from the trays, the "muddy streak" is removed as above set forth.

The fillets are then removed from the trays, the large rib bones removed and the lower fatty portion on the fillet, corresponding to the belly of the fish, is preferably trimmed off. The fillets are then flaked and packed into cans, slack fill. The cans are then exhausted either by the hot or mechanical exhausting methods, sealed and then processed at elevated temperatures for sterilizing. Where the hot exhausting method is utilized the filled cans with the covers loosely placed thereon are placed in the retort for 5 to 10 minutes, preferably about 8 minutes, at about 212° F. The cans are then removed from the retort and sealed in a closing machine after which they are returned to the retort and processed from ¾ to 2 hours at 220° F. to 260° F., preferably at about 240° F., followed by a quick water cooling for extracting heat from the cans. The time variance for processing depends on the size of the can, the larger can requiring a longer period.

The filled cans may also be exhausted by utilizing a vacuum closing machine in which the cans are placed, a vacuum drawn so as to de-gas the cans and the can lids sealed in place while the vacuum is drawn. A vacuum of 20 to 28 inches of mercury, preferably 23 inches of mercury vacuum, is employed when utilizing the mechanical vacuum closing method. The cans thus exhausted are then processed as described above for final cooking and sterilizing the contents thereof.

The cans may be filled with the dry, flaked fillet and any suitable sauces, oils or condiments may be added to the cans prior to the closing operations.

In a variation of the method the fish may be scaled and eviscerated and the heads removed. After brining as in the case of the fillets, the fish are placed in single layers on wire trays and pre-cooked with steam 1 to 2 hours at 220° F. to 260° F. and preferably 1–1½ hours at 240° F., after which they are removed from the pre-cooker and cooled. Cooling time depends upon the size of the batch and ambient temperature and may range from 1–2 hours to overnight.

The skin is then lifted off and the "muddy streak," then clearly discernible, is scraped out and the flesh removed from the bones. This is repeated for both sides of the fish. The flesh is then flaked and processed as in the case of the fillets.

In a further variation of the invention the whole fish, as received from the supplier, and having the heads and tails of the fish on and not eviscerated, may be scalded for a very short time in order to loosen the skin and scales which may then be removed easily by mechanical or manual methods. In carrying out the invention in accordance with this procedure the whole fish are scalded in a water bath which is maintained at substantially boiling temperatures by any suitable heating arrangement. This may be accomplished by a thermostatically controlled heater or by bleeding live steam into the scalding vat. The scalding operation may be carried out very conveniently by carrying the fish on a conveyor through the scalding bath, the conveyor speed being regulated so that the proper scalding time results. Before scalding the fish are preferably graded into three or more size brackets such as extra large fish over 10 pounds, large fish of 7 to 10 pounds, medium size fish of 5 to 7 pounds and small fish of 3 to 5 pounds. The scalding time for the small size fish, 3 to 5 pounds, is about 1 minute and 20 seconds; for the medium size fish, 5 to 7 pounds, 1 minute and 30 seconds; for the large fish, 7 to 10 pounds, 1 minute and 40 seconds; and for the extra large fish the scalding time is slightly increased in accordance with the size of the fish. Separate conveyors and scalding vats may be used for each size, or one size run at a time and the conveyor speed adjusted so as to give the proper scalding time for the size of fish being processed. The time of scalding is adjusted in accordance with the size of the fish so that the fish skin and scales are softened and made readily removable but so that the underlying flesh of the fish remains substantially unaffected. If too long a scalding time is used for the particular size fish undergoing treatment, the underlying flesh will be cooked and will break off and be lost as waste during subsequent treatment, and if the scalding time is too short the skin and scales are not easily removable. The scalding time may thus be defined generally as sufficient to loosen the skin and scales but not sufficient appreciably to cook the underlying flesh of the fish. The scalding time may vary from as low as 60 seconds for the smallest fish of less than 1 pound to a high as 120 seconds or even more for very large fish. The water in which the fish are scalded may have salts added thereto to raise the boiling point of the scalding water.

After the scalding operation the skin and scales are removed either by hand or by the use of machinery such as a tumbler. The removal of skin and scales can be done very easily by stripping the skin and scales by hand, but where large batches are handled costs may be lowered by using machinery.

Where using the tumbler the scalded fish are placed in a cylindrical tumbler made of expanded metal lath, and the tumbler slowly rotated. The skin and scales are sluffed off by mutual abrasion of the fish and by abrasion of the fish against the walls of the tumbler. The residue of skin and scales is washed off by a spray of water.

After removal of the skin and scales by machine tumbling the fish are inspected and any bits of skin and scales not removed in the previous mechanical operation are then removed. The heads and tails are then cut off and the fish eviscerated and the belly fat removed. These operations can be carried out conveniently by dumping the fish from the tumbler directly onto a moving belt where they are carried along past a series of workers for inspection and removal of bits of scale and skin and then through a decapitator and tailer and finally to an eviscerating station where the fish are eviscerated and the belly fat removed.

The fish are then washed preferably utilizing a brush washer for the inside of the fish followed by a spray wash of the entire fish carcass for removal of residues loosened in cleaning.

The "muddy streak" is not clearly discernible at this stage since the scalding operation does not cook the flesh of the fish and hence has not darkened the "muddy streak" relative to the remaining fleshy portions of the fish. If desired, however, the portion of the fish forming the "muddy streak" and which later becomes clearly discernible during the pre-cooking operation, may be removed in whole or in part at this point in the process. The "muddy streak" is not yet clearly discernible to the eye, but a skilled operator can, by using a V-shaped cutting tool, remove the portion of the fish flesh along the median line of the fish where the "muddy streak" is known to become later discernible. It may be pointed out that there is a fine not very clearly visible median line lengthwise of the fish along the approximate center of the "muddy streak" part of the flesh, and this assists the operator in removing the V-shaped cut of "muddy streak" material even though the streak as a whole is not discernible at this stage. When the "muddy streak" is removed at this juncture, this is accomplished before the washing operation.

The thus treated fish are then brined for 1 to 2½ hours by either the batch or continuous method.

The brine used should have a salinity of 80% to 100% saturation, preferably about 90% saturation at 75° F. For purposes of preparing the brine there may be used a salt composition containing 98.5% to 97% sodium chloride and 1½% to 3% of calcium chloride, or unrefined rock salt may be used with or without the addition of a minor percentage of calcium chloride. The length of time of brining depends upon the size of the fish, the smaller time interval being preferred for the small to medium size fish and a greater time interval for large or extra large fish. Where extra large fish are being handled the meaty portion of the fish may be slit lengthwise of the fish in order to permit ready penetration of the brine solution and also to facilitate heating during the subsequent pre-cooking operation.

After brining, the fish are then removed and washed either by spray or tub washing methods, drained and then placed on trays for pre-cooking. It may be noted that when utilizing whole fish in accordance with this method of the invention the capacity of the trays is greatly increased over the amount capable of being handled when the fish are filleted initially.

The fish on the trays are then pre-cooked for ¾ hour to 1½ hours at a temperature of 220° to 260° F. The preferred time and temperature is ¾ hour at 250° F. At the end of the pre-cooking operation the trays are removed from the pre-cooking retort, cooled to approximately room temperature which is usually accomplished in a time of about 1 to 2 hours. During the cooling time cool air may be blown over the fish in order to hasten the cooling and to speed removal of the moisture from the fish flesh.

Where the "muddy streak" has been removed earlier in the process the fish are then simply inspected to see whether there are any portions of the "muddy streak" remaining on the fish and if so, these are removed. When the "muddy streak" has not previously been removed, it is now clearly discernible and can be removed by the use of a V-shaped cutting tool.

The fish flesh is then removed from the larger bones, flaked and canned in accordance with the previously described procedures.

The invention is illustrated by the following examples which are merely illustrative and are not intended to be limiting upon the invention described and claimed:

Example A

Freshly caught carp were filleted by cutting on either side of the back bone so as to remove the central portion of the back bone structure. The ribs, severed from the back bone, were permitted to remain with the fillet which was removed from the outer skin by a short incisive cut between the skin portion and the flesh portion of the fillet. The fillets were then soaked for 2 hours in a sodium chloride salt brine of 100% saturation and after brining were removed and rinsed. The fillets were then placed in single layers in wire trays with the outside portion of the fillet (that portion adjacent the skin) arranged upwardly, and the trays placed in a steaming retort for 1¼ hours at 240° F. reducing the water content thereby. Following this the fillets were allowed to cool 1 hour. The darkened and relatively soft central "muddy streak" which thereby became apparent on the upper part of the fillets was removed by a triangular pointed knife, and the fillets removed and the larger rib bones which were loosened from the fleshy portion of the fillets by the steaming were likewise removed. At the same time the soft, somewhat oily portion of the fillets corresponding to the belly of the fish were trimmed off. The fillets were then flaked and packed into cans. In some of the cans there was added tomato sauce and others mustard sauce or cottonseed oil and the remainder packed dry without any additional sauce. The cans were then closed but not sealed and exhausted by heating with steam in a retort for 8 minutes at 212° F. The cans were then removed and immediately sealed and returned to the retort and processed for 75 minutes at 240° F. after which they were removed and quenched in cold water. The canned, flaked fillets were of firm, delicate texture, light in color and completely free from fishy or muddy taste or odor. The product is nutritious and of good flavor. The flavor and appearance resembles that of the white meat of chicken. The product has a high food value, being rich in proteins, calcium and vitamins, particularly vitamins A and D. In the filleting operation and the subsequent removal of the larger rib bones, the larger bones of the fish are removed but the smaller bones distributed throughout the flesh of the carp are not removed. These small bones were, however, reduced to a completely edible form and were hardly discernible from the remaining portion of the fillet. The edible bone residues add considerably to the calcium and phosphate contents of the product and are advantageous. When the carp used for canning is of relatively small size, even the small rib bones may be allowed to remain in the product since they were reduced to edible condition during the brining, steaming and cooking steps. When thus allowed to remain in the product they added to the calcium and phosphorus food values.

Example B

Fresh carp is filleted as in Example A and after filleting soaked for 2 hours in a sodium chloride salt brine having a salinity of 22% saturation, after which it was removed and dry salted overnight (approximately 8 hours). The fillets were then removed and soaked 45 minutes in cold water and after rinsing processed as in Example A. The resultant product was somewhat more salty than in Example A but the flavor was satisfactory and the product was firm in texture, of good color, nutritious and delicious. The smaller bones which were not removed were no longer discernible as bone and served as valuable natural mineral factors.

Example C

Fresh carp were scaled and the heads removed. The fish were not soaked in brine but were rinsed after cleaning and were placed in a single layer on wire trays and steamed for one hour at 240° F. whereupon they were removed from the steaming retort and cooled overnight in the trays. The skin was then scraped off and at the same time the "muddy streak" was removed by means of a blunt V-pointed instrument that was drawn down the median line of the fish. The flesh was then removed, flaked and put into cans. The cans were then separated into four batches and treated as follows: To the first batch tomato sauce was added, to the second batch cottonseed oil was added, to the third batch mustard sauce was added and to the fourth batch water was added. Dry salt, sufficient to season the fish to taste was then added to each can and the cans covered but not sealed. The cans were then placed in a retort and steamed for 5 minutes at 212° F. whereupon they were removed, sealed and returned to the retort and processed for 75 minutes at 240° F. Yield of flaked fish (canned) was 12.9% based upon the weight of the whole fish received.

Example D

Fresh fish were filleted as in Example A and rinsed but not brined. The fillets were then placed in wire trays with the part of the fillet toward the skin arranged upwardly and precooked with steam for 1½ hours at 240° F. The trays were then removed and the fillets permitted to cool to approximately room temperature while on the trays, whereupon the "muddy streak" which was then easily discernible was removed as in Example A and the larger rib bones which had been loosened from the fleshy portion of the fillet were taken out. At the same time the fatty portion of the fillet, corresponding to the belly of the fish, was trimmed off and the fillets flaked and packed into cans. The pack was divided into five batches. To the first batch there was added tomato sauce; to the second batch, cottonseed oil; to the third batch, mustard sauce; to the fourth batch, water; and to the fifth batch, flaked fish without any additional material. To the water pack batch and dry pack there was then added sufficient dry salt for seasoning and the cans of all batches were then covered but not sealed and exhausted and processed as in Example C. The resultant products were firm, nutritious, highly edible and full flavored. The color was desirable and the bones remaining were reduced to edible condition.

The yield of canned, flaked fish in Examples A, B, D and E average 17.4% of the weight of the fish as received.

Example E

Fresh fish was filleted as in Example A, brined for 2 hours in sodium chloride salt brine having a salinity of 100% saturation. The fillets were then removed, rinsed, and placed on wire trays with the portion of the fillet next to the skin positioned up. The trays of fillets were then steamed for 1 hour at 240° F. and the "muddy streak" which then became clearly discernible was removed, along with the larger bones which had loosened from the fleshy portion of the fillet. At the same time the fatty portion of the fillet corresponding to the belly of the fish was trimmed off. The thus processed fillets were then flaked and divided into five batches to which tomato sauce, cottonseed oil, mustard sauce and water were added. To one of the batches of flaked fillets no additions were made. The cans were then closed, exhausted and processed as in Example D. The flavor of all of the packs was excellent, the flesh firm and the product was nutritious and of full flavor.

Example F

Fish which had been quick frozen and stored for two weeks were thawed and part of the batch was scaled and the heads removed as in Example C and part of the batch filleted as in Examples A, B, D and E. Both batches were brined for one hour in a salt brine of 100% saturation and thereafter removed, rinsed and steamed for 1¼ hours at 240° F. The batch which had been scaled and the heads removed (but not filleted) was then treated as follows: The skin was folded back and the "muddy streak," thereby exposed, was removed by a sharp pointed instrument as described above. The flesh was then removed from the carcass, the fish turned over and the same process repeated on the opposite side. The portion of the batch that had been filleted was treated as follows: The "muddy streak" was removed by a sharp pointed instrument and the large bones that were then easily separable from the fleshy portion of the fillet and the fat belly portion of the fillet were removed. Each batch was then divided into 4 portions. To three of the portions there were added tomato sauce, cottonseed oil and mustard sauce, respectively, and the fourth portion was packed without any additional material. The cans were then covered but not sealed and placed in a retort and exhausted by heating with steam at 212° F. for eight minutes. The cans were then removed from the retort and processed for 75 minutes at 240° F. In every instance the canned fish was of delicious and edible character and the flesh was firm and nutritious. The yield of canned flaked fish was 19.2% of the whole fish starting material.

Example G

Fresh carp were filleted as in Example A and the fillets soaked for one hour in a salt brine of 100% saturation. The fillets were then removed from the brine, rinsed and placed in a single layer on wire trays with the portion of the fillet next to the skin up. The trays were then placed in a steam retort and pre-cooked for 1¼ hours at 240° F. The trays were then removed and the "muddy streak" removed before fillets are removed from the brine, and the bones and fatty portion of the fillet removed as heretofore described. The yield of flaked fish was approximately 15%, based upon the weight of the whole fish used as starting material. The flaked fillets were then filled into the cans and 1¼ ounces of cottonseed oil for each 5 ounces of flaked fish was added. The cans were then evacuated and sealed in a vacuum closing machine utilizing a vacuum of 23 inches of mercury. The sealed cans were then processed for 75 minutes at 240° F. and after processing were promptly water cooled. The product was firm, of good flavor and color and nutritious.

*Example H*

Fresh fish were scaled, eviscerated and the heads removed. The fish were not filleted or brined. The fish were then placed in a single layer on wire trays and pre-cooked for 1¼ hours at 240° F. The trays were then removed from the cooking chamber, held overnight and the skin lifted from the cooked flesh. The "muddy streak" which was then clearly visible was removed from each side of the fish and the flesh lifted from the bones, flaked and filled into cans. To each 5 ounces of flaked fish there was added 1¼ ounces of cottonseed oil and 4¼ grams of dry salt. The cans were then evacuated and sealed in a vacuum closing machine utilizing 23 inches of mercury vacuum and processed for 75 minutes at 240° F. The yield was 15.9% based upon the weight of the whole fish used as starting material. The resultant product was highly nutritious, of full flavor, light color and of firm texture.

*Example I*

Fresh fish were scaled, eviscerated and the heads removed as in Example H and soaked in a salt brine of 100% saturation for one hour whereupon they were cooked, held overnight, the "muddy streak" removed, the flesh lifted and flaked as in Example H. The yield was 17.7% of flaked fish based upon the whole weight of the carcass. The cans were then evacuated and sealed in a vacuum closing machine utilizing 25 inches of mercury pressure. The product was highly nutritious, of full flavor, good color and firm texture.

*Example J*

Fresh fish were treated as in Example H except that instead of holding the pre-cooked fish overnight the fish were held for only one hour after steaming, whereupon the skin and the "muddy streak" were removed and the flesh separated from the bone and flaked. The yield was 15.9% of flake based upon the weight of the whole fish used as starting material. The cans were then filled utilizing 1¼ ounces of cottonseed oil and 4¼ grams of dry salt to each 5 ounces of flaked fish. The cans were then evacuated and sealed in a vacuum closing machine in which the vacuum drawn was 23 inches of mercury pressure. The cans were then cooked at 240° F. for 75 minutes and promptly quenched in cold water. The resultant product was firm in texture, good flavor and color and of delicious and nutritious character.

*Example K*

Fresh carp with the heads and tails on, not eviscerated and as received from the supplier, were scalded by suspending them on hooks in a water bath that was maintained at approximately 212° F. by bleeding live steam thereinto. The fish in the batch undergoing treatment weighed from 4 to 8 pounds and were scalded for time intervals as follows: For fish of about 8 pounds the scalding time was 100 seconds; for fish of about 5-6 pounds the scalding time was 90 seconds; for fish of about 4-5 pounds the scalding time was 80 seconds. After scalding, the fish were placed on a work table and the skin and scales which were then thoroughly softened and easily removable, were peeled off by hand. The heads and tails were then cut off, the fish eviscerated and the belly fat removed. Then by using a V-shaped cutting knife a cut was made along the median line at each side of the fish in the place which by previous experience the "muddy streak" was known to become later discernible during the pre-cooking operation. In making this cut the fine line of cleavage in the fish flesh lengthwise of the fish on either side was used as a guiding line for the cut. The fish were then washed in running water, care being taken that the internal cavities of the fish were thoroughly cleaned. The fish were then divided into two batches. In the first batch the fish were brined in a brine solution containing a salt solution of 90% saturation. The temperature of the brine was about 60° F. and the fish were kept in the brine solution for one hour and then removed and rinsed. In the second batch the fish were brined in a solution of 90% saturated sodium chloride brine containing plus 3% calcium chloride. The calcium chloride percentage was by weight, based upon the amount of sodium chloride salt required for producing a saturated sodium chloride solution. In the second batch the temperature of the brine solution was approximately 60° F. and the fish were brined for one hour and then removed and rinsed.

The fish were then placed in single layers upon trays and the first batch pre-cooked for 1¼ hours at 240° F. The second batch was likewise placed on trays and pre-cooked for 45 minutes at 250° F. Both batches were then removed from the pre-cooking retort, cooled to approximately room temperature which required 1 to 1½ hours and were then inspected for the presence of the "muddy streak" material along the median line cuts previously made in the fish. In some cases some bits of "muddy streak" material, which had not been removed in the previous operation and which were now clearly discernible due to the darker color produced during pre-cooking, were now removed. The flesh of the fish was then removed from the larger bones, flaked and placed in cans. Cottonseed oil was added to each can in the ratio of 20 cc. of cottonseed oil for each 3.2 ounces of fish placed in the can. The oil was placed at the bottom of the cans and the flaked fish then hand packed to slack filled capacity. The cans were then evacuated and sealed on a vacuum closing machine utilizing a vacuum of 24 inches of mercury and were then processed for 75 minutes at 240° F. and after processing were promptly water cooled for 15 minutes in cold running water. The product in every instance was firm and of good flavor and color and was highly nutritious. In the case of the fish brined in the combined sodium chloride-calcium chloride brine, the fish when packed into the cans appeared to have a slightly lighter color and firmer texture as compared with the fish brined in ordinary sodium chloride brine.

In general it may be stated that the canned product is firm and of appetizing color and satisfactory flavor, the flavor being very good in most lots. In general there was an absence of pronounced fish flavor. The appearance and flavor were similar to canned chicken.

To insure proper distribution of sauces, oils, or condiments when used, they should be added hot to the cans when the heat exhaust method is used but they may be added cold when the vacuum closing method is used.

The process of this invention is also applicable to the canning of the better grades of fish such as perch, pike, trout and the like, but since these are not generally commercially available and in any event usually command a high value as fresh fish, the commercial advantages of canning them are much less than for the cheap grades of rough fish.

As many apparently widely different embodiments of this invention may be made without departing from the spirit and scope thereof, it is to be understood that I do not limit myself to the specific embodiments herein except as defined by the appended claims.

What I claim is:

1. In the canning of fresh water fish, the improved steps comprising prior to removal of the head or viscera, preliminarily scalding the fish in water at approximately boiling temperature for a time interval to loosen the skin and scales, the time of scalding being insufficient appreciably to cook the underlying flesh of the fish, then removing the skin, scales, head, tail and viscera, the process being characterized by removing the "muddy streak" portions of the flesh by cutting a V-shaped groove lengthwise of the fish along each side of the fish at the median line, and washing the fish.

2. In the canning of fresh water fish, the improved steps comprising prior to removal of the head or eviscera preliminarily scalding the fish in water which is maintained at approximately boiling temperature for a time interval sufficient to loosen the skin and scales but insufficient appreciably to cook the underlying flesh of the fish, tumbling the fish in a perforated revolving drum while running water thereover to remove the skin and scales, inspecting and removing any bits of skin or scale thereafter adhering to the fish, removing the tail, head, eviscera and belly fat, the process being characterized by removing the "muddy streak" portion of the flesh of the fish by cutting a V-shaped groove lengthwise of the fish along each side of the fish at the median line, and washing the fish.

3. The process of canning fresh water fish comprising preliminarily scalding the fish in water at approximately boiling temperature for a time interval to loosen the skin and scales, the time of scalding being insufficient appreciably to cook the underlying flesh of the fish, removing the skin, scales, head, tail and eviscera, washing the fish, brining the fish in a salt brine solution, precooking and cooling the fish, removing the flesh of the fish from the larger bones thereof, packing the flesh in cans and exhausting and sterilizing the can and contents, said process being further characterized in that at one stage in the process after the removal of skin and scales and prior to the removal of the flesh of the fish from larger bones, the "muddy streak" portions of the flesh of the fish are removed therefrom.

4. The process of claim 3 further characterized in that after scalding and prior to brining the "muddy streak" is removed by cutting out a V-shaped groove in the flesh of the fish lengthwise along each side of the fish at the median line location of the "muddy streak."

5. The process of claim 3 further characterized in that the "muddy streak" is removed after precooking and before removal of the flesh from the larger bones of the fish.

6. The process of claim 3 further characterized in that in brining the fish the brining solution contains sodium chloride and a minor percentage of calcium chloride.

7. The process of claim 3 further characterized in that in brining the fish the brining solution is an 80% to 100% saturated aqueous solution of a salt mixture composed of 98.5% to 97% sodium chloride and 1½% to 3% calcium chloride.

8. The process of canning fresh water fish which comprises brining, precooking and canning fish from which the head, tail, skin, scales, fins, eviscera and larger bones are removed in process, said process being characterized in that prior to canning, the "muddy streak" portions of the flesh of the fish are removed therefrom.

9. The process of canning fresh water fish from which the inedible portions of the fish, such as head, tail, skin, scales, fins, eviscera and larger bones are removed and the edible portions of the fish are canned and sterilized in the can, said process being characterized in that prior to canning the "muddy streak" along the outside of each side of the fish is removed and the flesh of the fish is brined and precooked.

10. In the process of canning the flavorsome, edible portions of fresh water fish from which inedible portions, such as the head, tail, skin, scales, fins, eviscera and larger bones, are removed during the process, the improved steps comprising cutting away the "muddy streak" along each side of the fish and brining and precooking fish prior to canning the fish, and sterilizing the product in the can.

11. In the process of canning the flavorsome edible portions of fresh water fish from which the inedible portions, such as the head, tail, skin, scales, fins, eviscera and larger bones, are removed, the improved steps which comprise, when the skin and scales are removed so as to expose the underlying flesh of the fish, cutting away the "muddy streak" by making a cut of generally V-shaped cross section along each side of the fish at said "muddy streak" so as to cut it away from the remainder of the fleshy portions of the fish, brining and precooking the remaining portions of the fish so as to reduce the moisture content thereof, and then canning and sterilizing the remaining fleshy portions of the fish.

12. The process of claim 11 further characterized in that the fish are brined in a sodium chloride salt solution of 80% to 100% strength for 1 to 2½ hours.

13. The process of claim 11 further characterized in that the fish are brined in a salt solution of 80% to 100% saturation wherein the salt used is a mixture of 97% to 98.5% sodium chloride and the remainder calcium chloride.

14. The process of claim 11 further characterized in that the fish are precooked with steam for ¾ hour to 1½ hours at a temperature of 220° to 260° F.

15. The process of claim 11 further characterized in that the fish are filleted before the removal of the "muddy streak," brining and precooking.

ARMIN R. KLEINSCHMIDT.